United States Patent
Huang

(10) Patent No.: US 7,962,179 B2
(45) Date of Patent: Jun. 14, 2011

(54) HANDHELD ELECTRONIC DEVICE

(75) Inventor: Hsiao-Chuan Huang, Tao Yuan (TW)

(73) Assignee: HTC Corporation, Taoyuan County (TW)

( * ) Notice: Subject to any disclaimer, the term of this patent is extended or adjusted under 35 U.S.C. 154(b) by 867 days.

(21) Appl. No.: 11/845,791

(22) Filed: Aug. 28, 2007

(65) Prior Publication Data
US 2008/0064448 A1  Mar. 13, 2008

(30) Foreign Application Priority Data
Sep. 8, 2006  (TW) .............................. 95133171 A

(51) Int. Cl.
*H04Q 7/20* (2006.01)
(52) U.S. Cl. .................. 455/566; 455/575.1; 455/550.1; 345/659; 361/679.06
(58) Field of Classification Search ............... 455/575.1, 455/566, 550.1; 345/659; 361/681
See application file for complete search history.

(56) References Cited

U.S. PATENT DOCUMENTS

| 2006/0037175 | A1 | 2/2006 | Hyun | |
| 2007/0047187 | A1* | 3/2007 | Kumano et al. | 361/681 |
| 2008/0045279 | A1* | 2/2008 | Ohki | 455/575.1 |

FOREIGN PATENT DOCUMENTS

| CN | 1617613 | 5/2005 |
| CN | 1741721 | 3/2006 |

OTHER PUBLICATIONS

"1st Office Action of China Counterpart Application", issued on Feb. 6, 2009, p. 1-p. 6.

* cited by examiner

*Primary Examiner* — Danh C Le
(74) *Attorney, Agent, or Firm* — Jianq Chyun IP Office

(57) ABSTRACT

A handheld electronic device includes a display body, an input body and at least a track. The input body and the display body are overlapped with each other. The track is disposed between the display body and the input body, wherein the extending direction of the track is substantially neither perpendicular to nor parallel to the longitudinal direction or the traverse direction of the display body or the input body, and the track enables the display body to switch between at a first position and at a second position relative to the input body. The traverse direction of the display body is substantially parallel to the traverse direction of the input body when the input body is at the first position, and the longitudinal direction of the display body is substantially parallel to the longitudinal direction of the input body when the input body is at the second position.

12 Claims, 4 Drawing Sheets

HANDHELD ELECTRONIC DEVICE

CROSS-REFERENCE TO RELATED APPLICATION

This application claims the priority benefit of Taiwan application serial no. 95133171, filed Sep. 8, 2006. All disclosure of the Taiwan application is incorporated herein by reference.

BACKGROUND OF THE INVENTION

1. Field of the Invention

The present invention generally relates to a handheld electronic device, and more particular, to a handheld electronic device that can be operated in a longitudinal direction and in a traverse direction.

2. Description of Related Art

A handheld electronic device refers to an electronic device suitable for a user to hold and operate the same, for example, a mobile phone, a multimedia player, a personal digital assistant (PDA), a handheld computer, a handheld game machine and a handheld GPS (global positioning system) receiver etc. The electronic device of the sort usually has a small volume, light, and portable for a user to carry it. Taking the mobile phone as an example, an early mobile phone has a bar-style design. However, later, in order to promote the portability while keeping the areas of the screen and the keyboard thereof unchanged, a flip-style (clamshell-style) mobile phone and a slide-style mobile phone were developed.

A flip-style mobile phone usually includes two bodies which are linked together by using a hinge mechanism to make two side edges thereof pivoted thereon, while the main screen and the keyboard thereof are respectively disposed on each of the inner side of the two bodies. In this way, the two bodies of the flip-style mobile phone can be folded during carriage, and unfolded during operation. A slide-style mobile phone has two bodies as well, but the two bodies thereof are linked together by using a sliding mechanism, and the screen and the keyboard thereof are respectively disposed on the outer side of the upper layer body and the inner side of the lower layer body thereof. Similarly, the two bodies of the slide-style mobile phone can be overlapped with one another during carriage, and slid by one another during operation as well.

Compared to the flip-style mobile phone where the main screen is disposed on the inner side of the bottom one of the two bodies, the main screen of the slide-style mobile phone is disposed on the outer side of the bottom one of the two bodies thereof. Therefore, regardless of a standing-by mode or an operating mode, the screen of a slide-style mobile phone remains exposed on the outer side thereof. Along with the progressive advancement of the technology and usage, a mobile phone with multiple operation modes is being continuously developed to attract customers and provide additional versatility to the customers.

In order to make the relative position of the two bodies of a mobile phone switched between two different placements, a conventional mobile phone with multiple operation modes is equipped with two orthogonal sliding tracks between the two bodies thereof, so that the mobile phone has a phone operation mode after a relative sliding motion in the longitudinal direction thereof between the two bodies or a typing operation mode after a relative sliding motion in the traverse direction thereof between the two bodies. However, the sliding motion of such a mobile phone is not smooth and the appearance of the mobile phone is not novel or attractive.

SUMMARY OF THE INVENTION

An aspect of the present invention is to provide a handheld electronic device with multiple operation modes for different applications.

To achieve the above-mentioned or other aspects, the present invention provides a handheld electronic device. The handheld electronic device includes a display body, an input body and at least a track. The input body and the display body are overlapped with each other. The track is disposed between the display body and the input body, wherein the extending direction of the track is substantially neither perpendicular to nor parallel to the longitudinal direction or the traverse direction of the display body or the input body, but the track enables the display body to be switched between at a first position and at a second position relative to the input body. At the first position, the traverse direction of the display body is substantially parallel to the traverse direction of the input body, while at the second position, the longitudinal direction of the display body is substantially parallel to the longitudinal direction of the input body.

In an embodiment of the present invention, the above-mentioned display body completely overlays the input body when the display body is located at the first position, while at least a portion of the display body overlaps the input body when the display body is located at the second position.

In an embodiment of the present invention, the length of the above-mentioned display body is less than the length of the input body.

In an embodiment of the present invention, during a translational motion of the above-mentioned display body relative to the input body, the track makes the longitudinal direction of the display body substantially parallel to the longitudinal direction of the input body.

In an embodiment of the present invention, the above-mentioned handheld electronic device further includes at least a guiding block disposed between the input body and the display body, so that the relative movement of the guiding block along the track causes a translational motion of the display body relative to the input body.

In an embodiment of the present invention, the above-mentioned handheld electronic device further includes an image output interface disposed on the display body.

In an embodiment of the present invention, the translational motion of the above-mentioned display body relative to the input body along the track is able to provide an operation mode switch between a first operation mode and a second operation mode, wherein the first operation mode makes the image output interface work in a portrait display mode, while the second operation mode makes the image output interface work in a landscape display mode.

In an embodiment of the present invention, the above-mentioned input body has a first area and a second area locally overlapped with the first area, and the first area is exposed when the display body is at the first position.

In an embodiment of the present invention, the above-mentioned handheld electronic device further includes a press input interface disposed on the input body.

In an embodiment of the present invention, the above-mentioned press input interface includes a dialing keypad and a standard keypad, the dialing keypad is disposed at the first area, the standard keypad is disposed at the second area and some keys of the standard keypad and some keys of the dialing keypad are shared by each other.

In an embodiment of the present invention, the above-mentioned press input interface is at least one selected from the group consisting of a standard keyboard, a video play key, numeric keys, dialing keys, navigation keys, hot keys, speed dialing keys, a Windows key and an ending key.

To achieve the above-mentioned or other aspects, the present invention provides a handheld electronic device, which includes a display body, an input body and at least a track. The display body has a portrait display mode and a landscape display mode. The input body and the display body are overlapped with each other. The track is disposed between the display body and the input body and is substantially disposed obliquely to the longitudinal direction and the traverse direction of the display body or the input body, so that the input body can be operated in association with the display body either in the landscape display mode or in the portrait display mode.

In an embodiment of the present invention, the above-mentioned track enables the display body to be switched between at a first position and at a second position relative to the input body. At the first position, the traverse direction of the display body is substantially parallel to the traverse direction of the input body, while at the second position, the longitudinal direction of the display body is substantially parallel to the longitudinal direction of the input body.

In an embodiment of the present invention, the above-mentioned display body completely overlays the input body when the display body is located at the first position, while at least a portion of the display body overlaps the input body when the display body is located at the second position.

In an embodiment of the present invention, the length of the above-mentioned display body is less than the length of the input body.

In an embodiment of the present invention, during a translational motion of the above-mentioned display body relative to the input body, the track makes the longitudinal direction of the display body substantially parallel to the longitudinal direction of the input body.

In an embodiment of the present invention, the above-mentioned handheld electronic device further includes at least a guiding block fixed between the input body and the display body, so that the movement of the guiding block along the track causes a translational motion of the display body relative to the input body.

In an embodiment of the present invention, the above-mentioned handheld electronic device further includes an image output interface disposed on the display body.

In an embodiment of the present invention, the translational motion of the above-mentioned display body relative to the input body along the track is able to provide an operation mode switch between a first operation mode and a second operation mode, wherein the first operation mode makes the image output interface work in portrait display mode, while the second operation mode makes the image output interface work in landscape display mode.

In an embodiment of the present invention, the above-mentioned input body has a first area and a second area overlapped with each other, and the first area is exposed when the display body is at the first position.

In an embodiment of the present invention, the above-mentioned handheld electronic device further includes a press input interface disposed on the input body.

In an embodiment of the present invention, the above-mentioned press input interface includes a dialing keypad and a standard keypad, the dialing keypad is disposed at the first area, the standard keypad is disposed at the second area and some keys of the standard keypad and some keys of the dialing keypad are shared by each other.

In an embodiment of the present invention, the above-mentioned press input interface is at least one selected from the group consisting of a standard keyboard, a video play key, numeric keys, dialing keys, navigation keys, hot keys, speed dialing keys, a Windows key and an ending key.

The present invention uses an obliquely-disposed track to make the display body have at least two different positions relative to the input body and the two positions are respectively corresponding to an operation mode.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
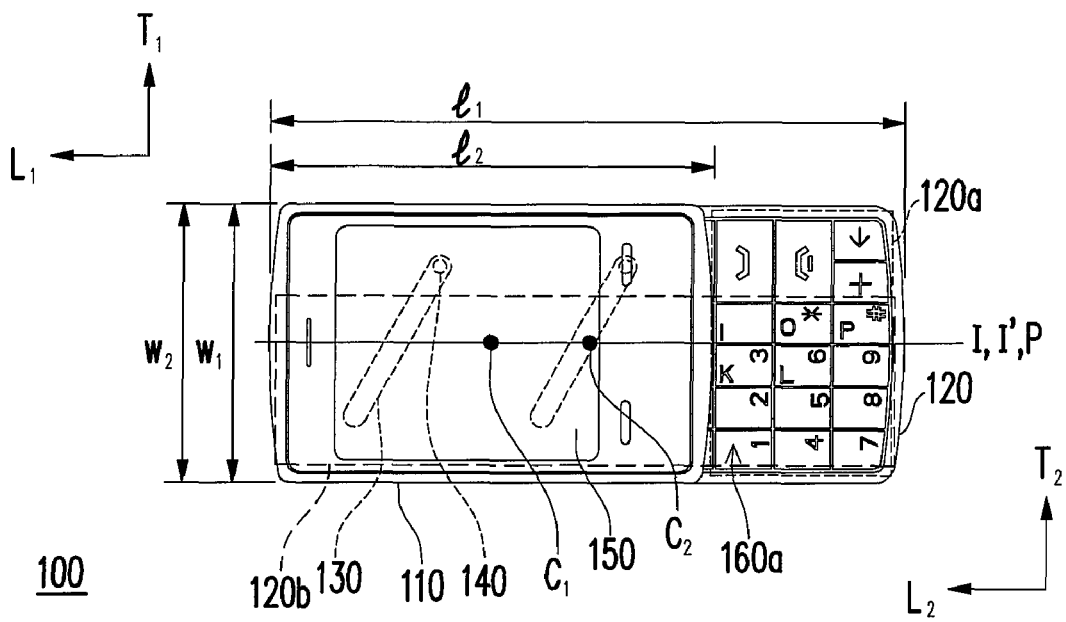
FIG. 1A is a top view of a handheld electronic device with a display body at a first position in an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
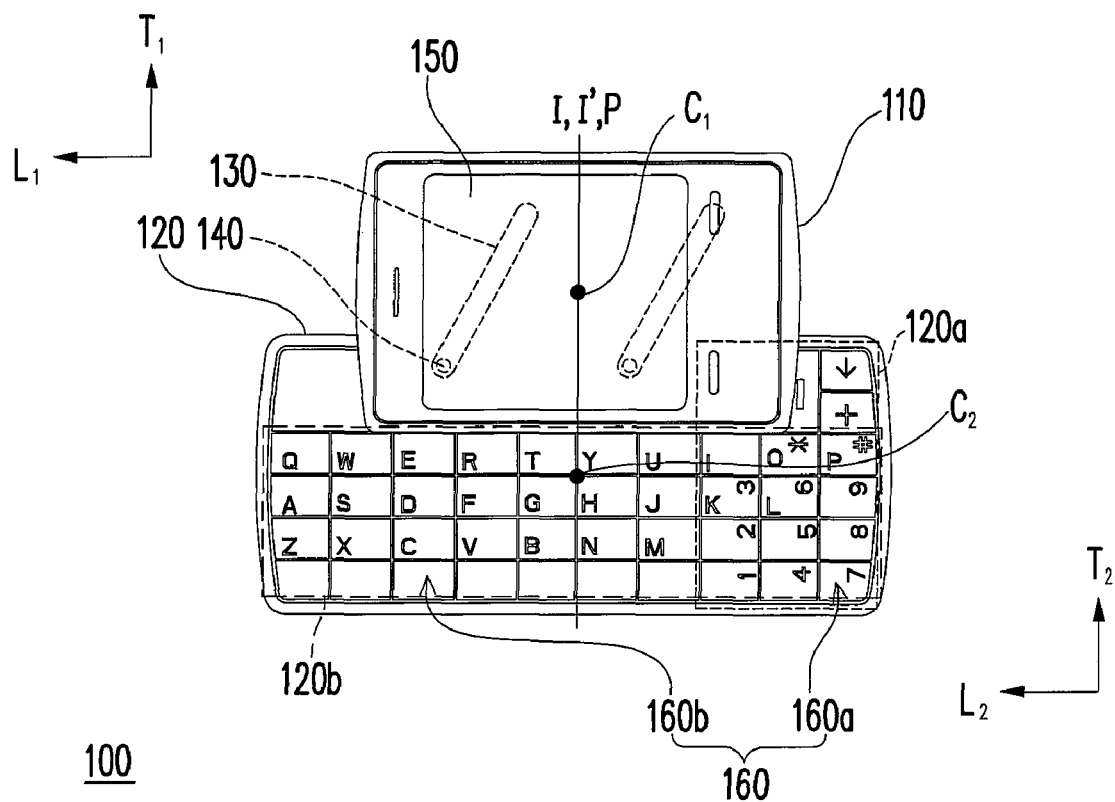
FIG. 1B is a top view of the handheld electronic device of FIG. 1A with the display body at a second position.

FIG. 1A is a top view of a handheld electronic device with a display body at a first position in an embodiment of the present invention. FIG. 1B is a top view of the handheld electronic device of FIG. 1A with the display body at a second position. Referring to FIGS. 1A and 1B, the handheld electronic device 100 of the embodiment is, for example, a mobile phone, a multimedia player, a PDA, a palmtop computer, a palmtop game machine and a handheld GPS receiver etc.

The handheld electronic device 100 includes a display body 110, an input body 120 and a track 130. The display body 110 has a portrait display mode and a landscape display mode, while the input body 120 and the display body 110 are overlapped with each other. The track 130 is disposed between the display body 110 and the input body 120 and is substantially neither perpendicular to nor parallel to the longitudinal directions $L_1$ and $L_2$ and the traverse directions $T_1$ and $T_2$ both of the display body 110 and the input body 120. In other words, the track 130 is substantially disposed obliquely to the longitudinal directions and the traverse directions relative to both display body 110 and input body 120. In other embodiments, the handheld electronic device may have multiple tracks, however the present invention does not limit to any number of the tracks as such.

The track 130 enables the display body 110 to switch between at a first position and at a second position relative to the input body 120. At the first position, the traverse direction $T_1$ of the display body 110 is substantially parallel to the traverse direction $T_2$ of the input body 120, while at the second position, the longitudinal direction $L_1$ of the display body 110 is substantially parallel to the longitudinal direction $L_2$ of the input body 120.

In the embodiment, the projection of the geometric center $C_1$ of the display body 110 at the above-mentioned first position on the input body 120 is located on a side of the geometric center $C_2$ of the input body 120 along the longitudinal direction $L_2$ of the input body 120, as shown in FIG. 1A; the projection of the geometric center $C_1$ of the display body 110 at the second position on the input body 120 is located on a side of the geometric center $C_2$ of the input body 120 along the traverse direction $T_2$ of the input body 120, as shown in FIG. 1B.

Figure 2A:
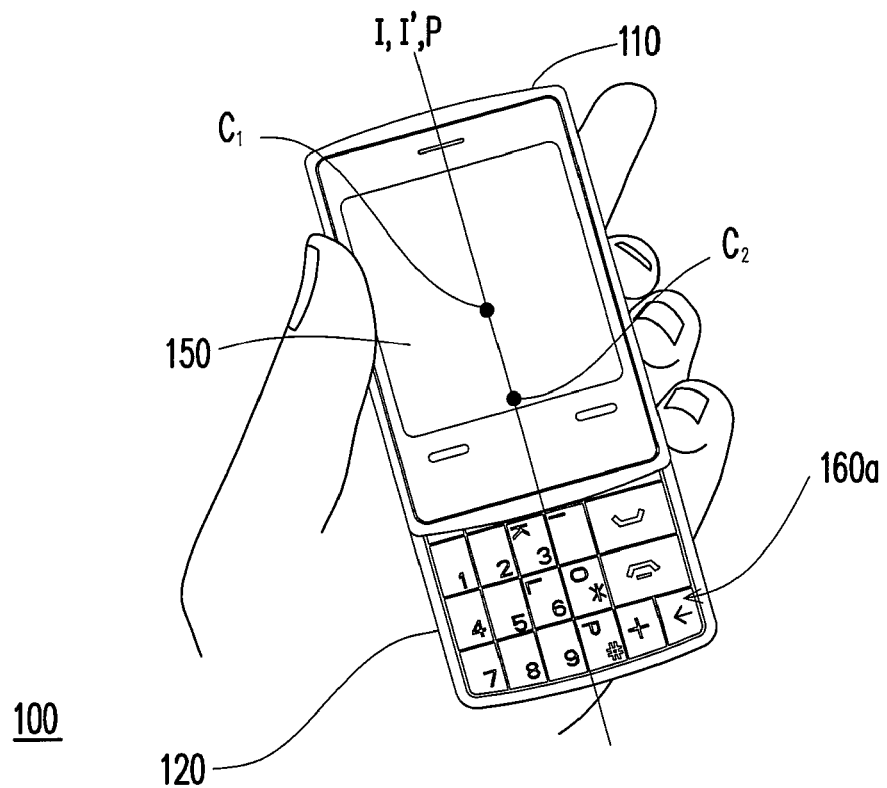
FIGS. 2A-2C are diagrams showing the sliding action of the display body in FIG. 1A manually operated by a user from the first position to the second position.
Figure 2B:
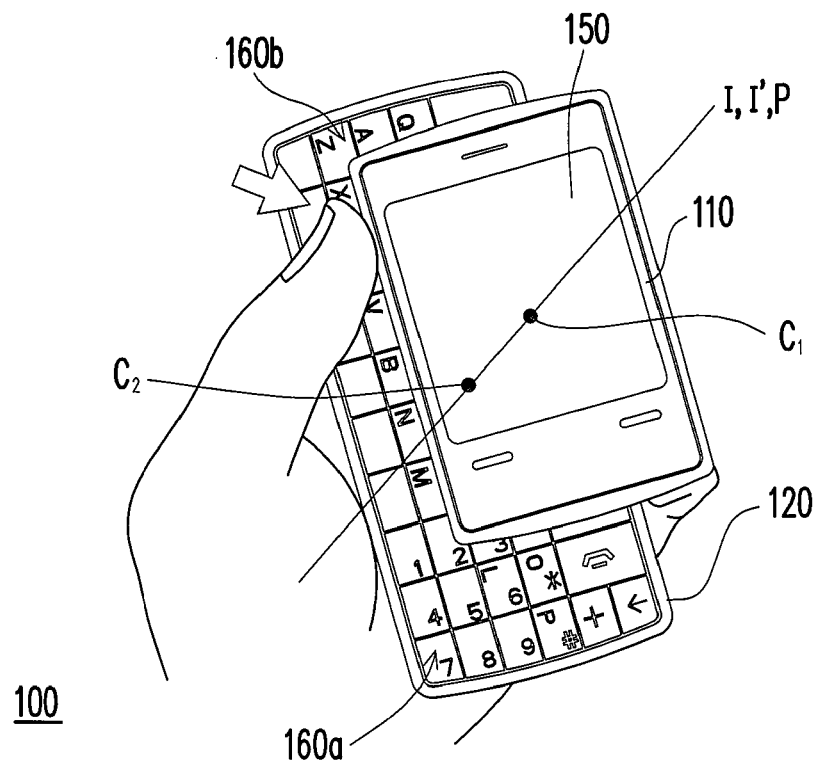
Figure 2C:
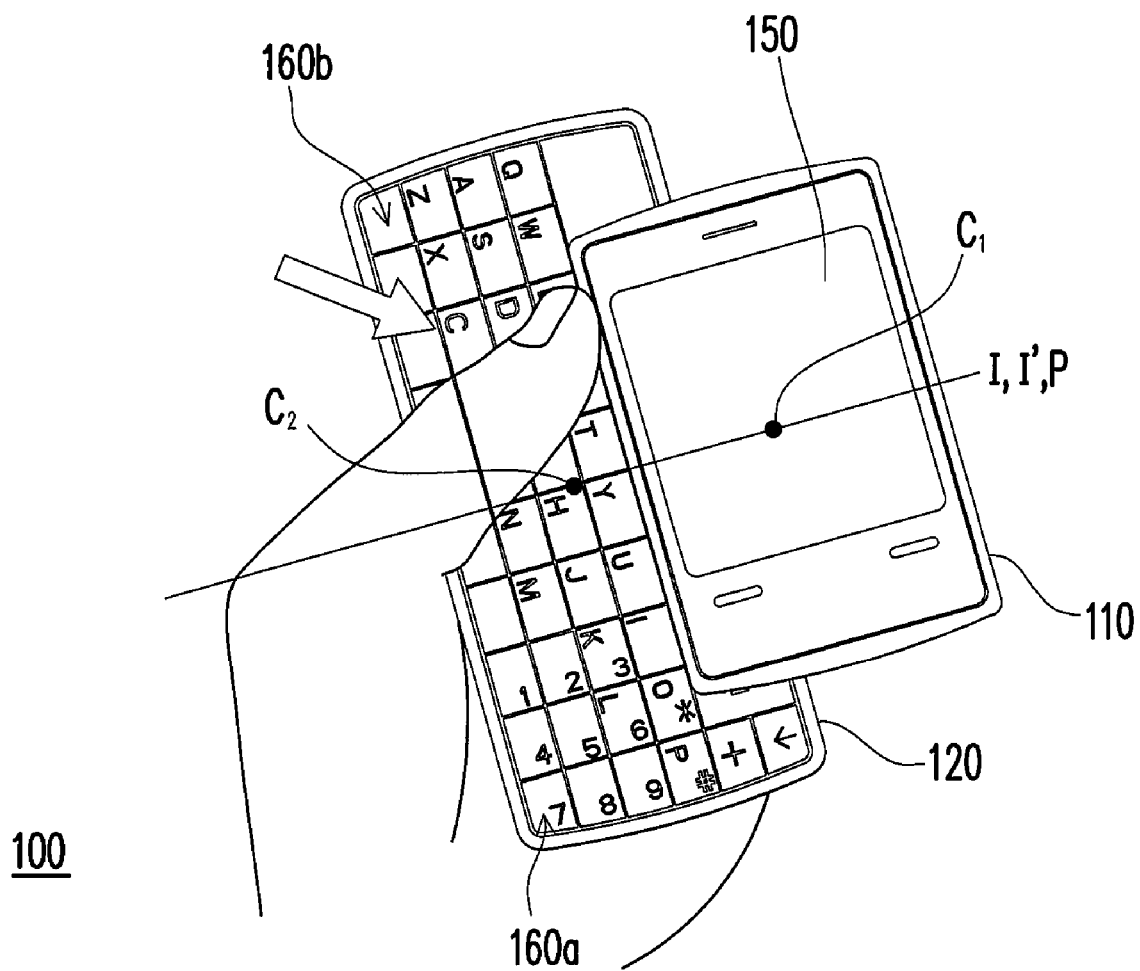

FIGS. 2A-2C are diagrams showing the sliding action of the display body in FIG. 1A manually operated by a user from the first position to the second position. Referring to FIGS. 2A-2C, when the display body 110 is at the first position (as shown by FIG. 2A), a user can obliquely push the display body 110 (as shown by FIG. 2B) to move the display body 110 to the second position (as shown by FIG. 2C).

The handheld electronic device 100 further includes a guiding block 140 which is fixed at the input body 120 and suitable for being moved along the track 130. When the guiding block 140 is engaged with the track 130, the movement of the guiding block 140 along the track 130 makes the movement of the display body 110 relative to the input body 120. However, the present invention does not limit to any particular number of the guiding blocks as such as long as the guiding block(s) can be engaged with the track so as to facilitate the movement of the display body 110 to the input body 120.

Figure 3A:
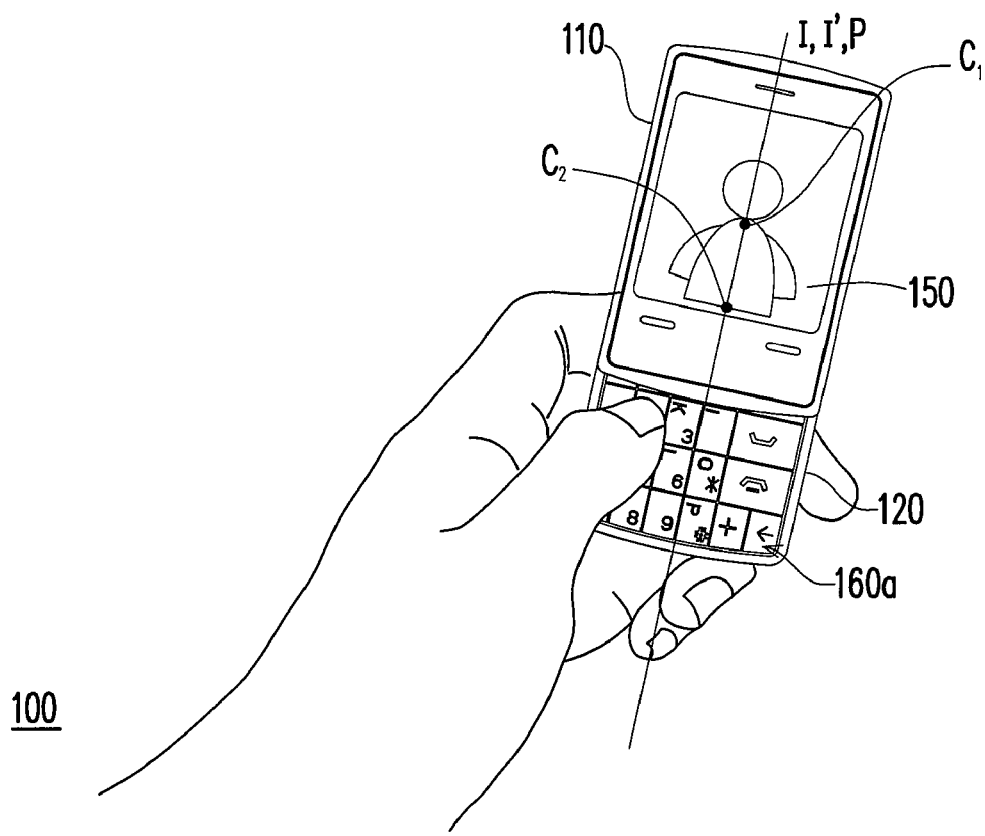
FIG. 3A is a diagram showing the handheld electronic device in FIG. 1A in the first operation mode.
Figure 3B:
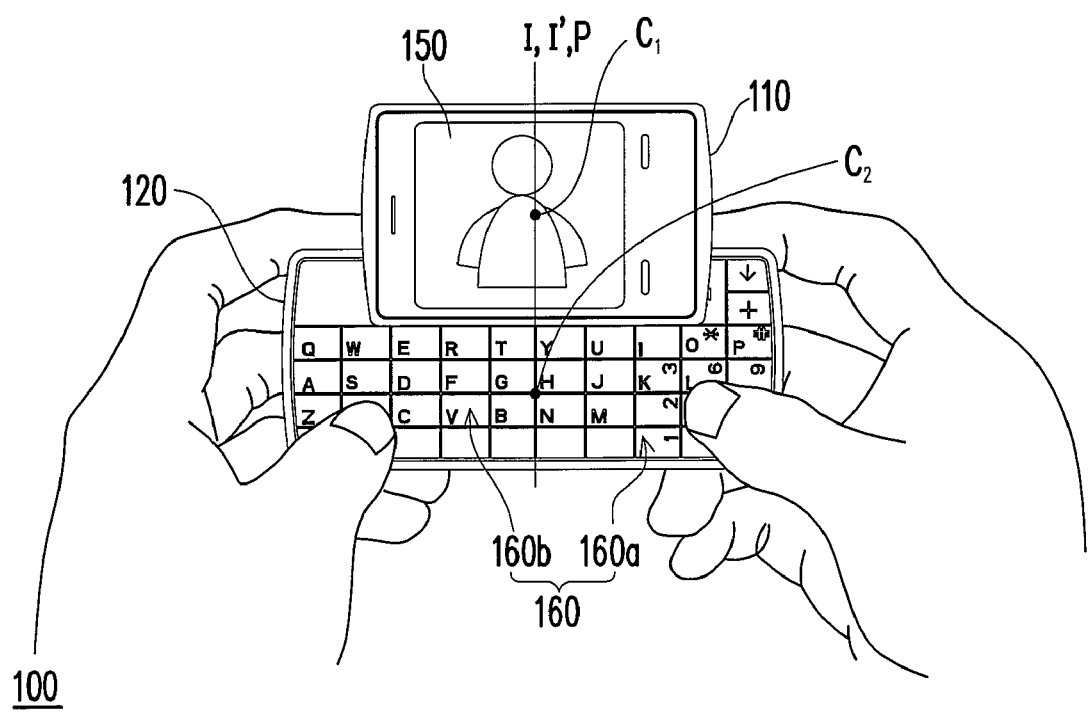
FIG. 3B is a diagram showing the handheld electronic device in FIG. 1A in the second operation mode.

FIG. 3A is a diagram showing the handheld electronic device in FIG. 1A in the first operation mode and FIG. 3B is a diagram showing the handheld electronic device in FIG. 1A in the second operation mode. Referring to FIGS. 3A and 3B, at the first position, the display body 110 provides a portrait display mode and the handheld electronic device 100 at the point in the first operation mode as shown by FIG. 3A; at the second position, the display body 110 provides a landscape display mode and the handheld electronic device 100 at the point in the second operation mode as shown by FIG. 3B. In this way, the single input body 120 can be operated in the portrait display mode or the landscape display mode. Normally, the first operation mode is suitable for mobile phone, while the second operation mode is suitable for video entertainment or PDA etc., however, the present invention does not limit thereto as such.

When the above-mentioned display body 110 is at the second position, with reference to the plane P formed by the connecting line I between the geometric center $C_1$ of the display body 110 and the geometric center $C_2$ of the input body 120 and the projection line of the connecting line I on the input body 120, the two geometric shapes of both sides of the display body 110 and the two geometric shapes of both sides of the input body 120 are substantially the same, respectively. In more detail, when the display body 110 is at the second position, the handheld electronic device 100 is in the second operation mode; at this point, when a user is holding the input body 120 or looking at the display body 110, the handheld electronic device 100 appears in left-right symmetry.

Referring to FIGS. 1A and 1B again, the display body 110 at the first position completely overlays a local part of the input body 120, while the display body 110 at the second position only partially overlaps a local part of the input body 120, i.e. the display body 110 at the point is overlapped with the input body 120. In more detail, the input body 120 has a first area 120a and a second area 120b overlapped with the first area 120a. The display body 110 at the first position exposes the first area 120a as shown by FIG. 1A; the display body 110 at the second position exposes the whole second area 120b and covers a local part of the first area 120a as shown by FIG. 1B.

In the embodiment, the length $l_1$ of the display body 110 may be less than the length $l_2$ of the input body 120, while the width $w_1$ of the display body 110 is substantially equal to the width $w_2$ of the input body 120. Besides, during a translational motion of the above-mentioned display body 110 relative to the input body 120, the track 130 enables the longitudinal direction $L_1$ of the display body 110 substantially parallel to the longitudinal direction $L_2$ of the input body 120. Those skilled in the art may be able to deduce similar designs to achieve the purpose of the present invention, which is construed to be within the scope of the present invention.

In order to output images for a user to view, the handheld electronic device 100 further includes an image output interface 150, for example, a display, disposed on the display body 110. Therefore, when the display body 110 is at the first position and the handheld electronic device 100 is in the first operation mode as shown by FIG. 3A, the first operation mode makes the image output interface 150 to operate in the portrait display mode, where the information content output from the image output interface 150 is disposed in longitudinal direction associated with the viewing direction of the user. Besides, when the display body 110 is at the second position and the handheld electronic device 100 is in the second operation mode as shown by FIG. 3B, the second operation mode makes the image output interface 150 operate in the landscape display mode, where the information content output from the image output interface 150 is disposed in traverse direction associating with the viewing direction of the user.

To input commands or texts, the handheld electronic device 100 further includes a press input interface 160, for example, a keypad, disposed on the input body 120. The press input interface 160 includes a dialing keypad 160a and a standard keypad 160b. Herein the dialing keypad 160a is disposed at the first area 120a, while the standard keypad 160b is disposed at the second area 120b, and some keys of the dialing keypad 160a and some keys of the standard keypad 160b are shared by each other.

It should be noted that the above-mentioned press input interface 160 is at least one selected from the group consisting of a standard keyboard, a video play key, numeric keys, dialing keys, navigation keys, hot keys, speed dialing keys, a Windows key and an ending key. By using the press input interface 160, the user is able to operate the handheld electronic device 100.

The present invention uses an obliquely disposed track for the display body to have at least two different positions relative to the input body. Thus, the handheld electronic device can take advantage of the different positions of the display body and the associated software functions to enable the handheld electronic device to run in different operation modes, for example, phone calling, audio/video or PDA etc., which enhances the convenience and pleasure of the user during operating the handheld electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
 a display body, having a portrait display mode and a landscape display mode;
 an input body, overlapped with the display body; and
 at least a linear track, disposed between the display body and the input body, wherein the linear track is substantially disposed obliquely to a longitudinal direction and a transverse direction of the display body or the input body so that the input body can be operated in association with the display body either in the landscape display mode or in the portrait display mode,
 wherein the linear track enables the display body to linearly switch between a first position and a second position relative to the input body.

2. The handheld electronic device according to claim 1, wherein a traverse direction of the display body is substantially parallel to a traverse direction of the input body when the display body is at the first position and a longitudinal direction of the display body is substantially parallel to a longitudinal direction of the input body when the display body is at the second position.

3. The handheld electronic device according to claim 2, wherein the display body completely overlays the input body when the display body is at the first position and at least a part of the display body overlaps the input body when the display body is at the second position.

4. The handheld electronic device according to claim 2, further comprising an image output interface disposed on the display body.

5. The handheld electronic device according to claim 4, wherein the translational motion of the display body relative to the input body along the linear track provides an operation mode switch between a first operation mode and a second operation mode, wherein the first operation mode allows the image output interface to operate in a portrait display mode, while the second operation mode allows the image output interface operate in a landscape display mode.

6. The handheld electronic device according to claim 1, wherein a length of the display body is less than a length of the input body.

7. The handheld electronic device according to claim 1, wherein during a translational motion of the display body relative to the input body, the linear track makes the longitudinal direction of the display body substantially parallel to the longitudinal direction of the input body.

8. The handheld electronic device according to claim 1, further comprising at least a guiding block fixed between the input body and display body so that the relative movement of the guiding block along the linear track causes a translational motion of the display body relative to the input body.

9. The handheld electronic device according to claim 1, wherein the input body has a first area and a second area locally overlapped with the first area, and the first area is exposed when the display body is at the first position.

10. The handheld electronic device according to claim 9, further comprising a press input interface disposed on the input body.

11. The handheld electronic device according to claim 10, wherein the press input interface includes a dialing keypad and a standard keypad, the dialing keypad is disposed at the first area, the standard keypad is disposed at the second area and some keys of the standard keypad and some keys of the dialing keypad are shared by each other.

12. The handheld electronic device according to claim 10, wherein the press input interface is at least one selected from the group consisting of a standard keyboard, a video play key, numeric keys, dialing keys, navigation keys, hot keys, speed dialing keys, a windows key and an ending key.

* * * * *